United States Patent [19]

Fourche et al.

[11] Patent Number: 4,925,420

[45] Date of Patent: May 15, 1990

[54] METHOD FOR THE AUTOMATIC MEASUREMENT OF CONVERGENCE AND FOR THE DETERMINATION OF CORRECTIONS TO BE MADE IN TRICHROMATIC CATHODE TUBE DEFLECTORS AND MACHINE FOR THE APPLICATION OF THIS METHOD

[75] Inventors: Jean-Pierre Fourche, Dijon; Guy Legrand, Ruff les Echirey; Michel Faivre; Olivier Berthaut, both of Dijon, all of France

[73] Assignee: Videocolor, Montrouge, France

[21] Appl. No.: 155,054

[22] Filed: Feb. 11, 1988

[30] Foreign Application Priority Data

Feb. 13, 1987 [FR] France .................. 87 01864

[51] Int. Cl.⁵ .................. H01T 21/06; H01J 9/18
[52] U.S. Cl. .................. 445/3; 445/63; 445/64; 335/212; 358/10
[58] Field of Search .................. 445/3, 36, 63, 64; 335/211, 212; 324/207, 208; 315/368; 358/10

[56] References Cited

U.S. PATENT DOCUMENTS

| | | | |
|---|---|---|---|
| 3,844,006 | 10/1974 | McGlashan | 445/3 |
| 4,163,308 | 8/1979 | Tawa et al. | 445/3 |
| 4,172,309 | 10/1979 | Chiodi | 445/3 |
| 4,405,950 | 9/1983 | Wardell, Jr. | 445/3 |
| 4,515,568 | 5/1985 | Cormio | 445/3 |
| 4,606,729 | 8/1986 | Kuiper | 445/3 |

FOREIGN PATENT DOCUMENTS

| | | | |
|---|---|---|---|
| 0049123 | 7/1982 | European Pat. Off. | |
| 0120767 | 3/1984 | European Pat. Off. | |
| 0123611 | 10/1984 | European Pat. Off. | 445/3 |
| 0123613 | 10/1984 | European Pat. Off. | 445/3 |
| 0175619 | 3/1986 | European Pat. Off. | 445/3 |
| 0056354 | 5/1979 | Japan | 445/3 |
| 0038532 | 3/1982 | Japan | 445/3 |
| 0004245 | 1/1983 | Japan | 445/3 |
| 0013531 | 1/1986 | Japan | 445/3 |

OTHER PUBLICATIONS

L'Onde Electrique, vol. 48, No. 499, Oct. 1968, pp. 894–897, Paris, FR; J. -C. Stern: "Contribution aux Measures Objectives de Convergence sur Tube Cathodique Trichrome a Masque Perfore".

Primary Examiner—Kurt Rowan
Attorney, Agent, or Firm—Oblon, Spivak, McClelland, Maier & Neustadt

[57] ABSTRACT

For the automatic determining of the characteristics of the corrections to be made in trichromatic cathode tube deflectors, measurements are made of the coordinates of the midpoints of the bars R and B of a crossed bar test pattern at "strategic" places. With the deflector in the "mean" position on the tube, the values obtained are standardized by computation to re-establish virtually the ideal position of the deflector, the convergence errors due to this deflector are computed and the pinpoint or overall corrections to be made to it are deduced therefrom.

13 Claims, 2 Drawing Sheets

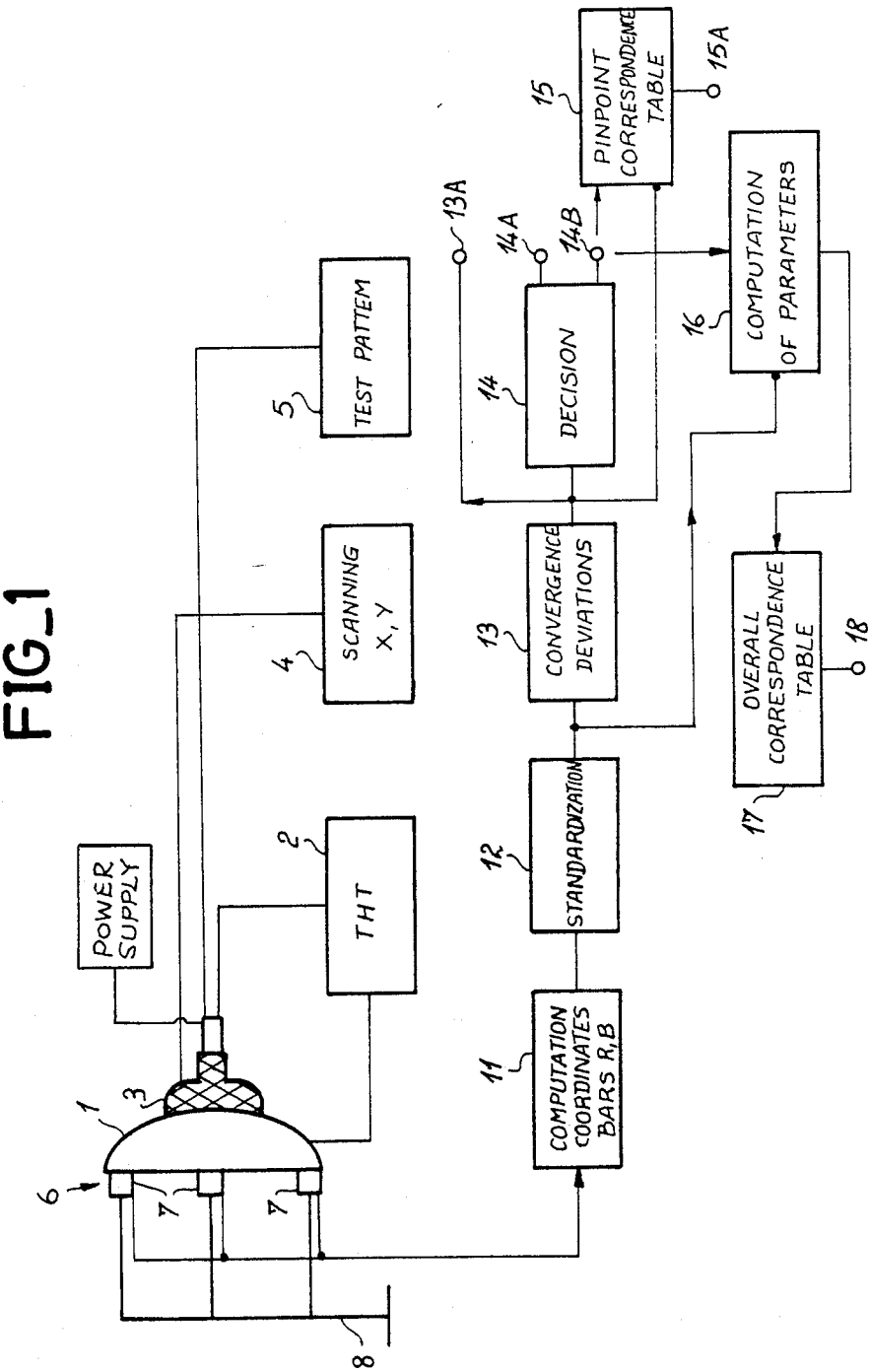
FIG_1

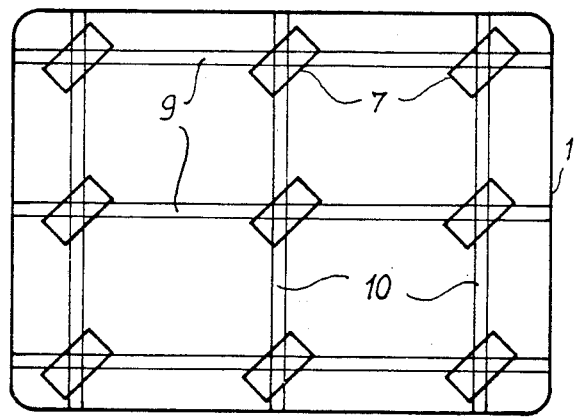
FIG_2
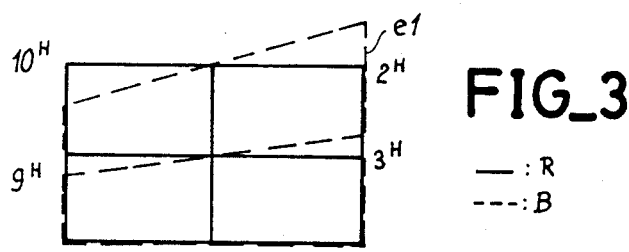
FIG_3
— : R
--- : B
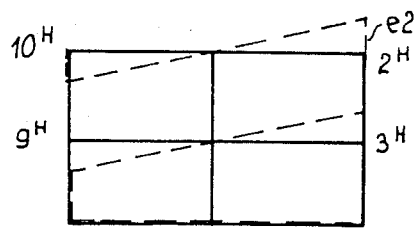
FIG_4
— : R
--- : B
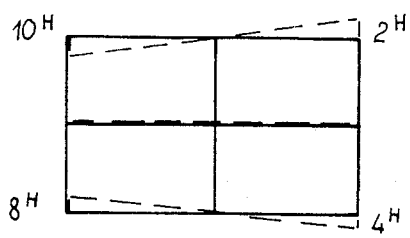
FIG_5
— : R
--- : B

METHOD FOR THE AUTOMATIC MEASUREMENT OF CONVERGENCE AND FOR THE DETERMINATION OF CORRECTIONS TO BE MADE IN TRICHROMATIC CATHODE TUBE DEFLECTORS AND MACHINE FOR THE APPLICATION OF THIS METHOD

BACKGROUND OF THE INVENTION

1. Field of the Invention

The present invention pertains to a method for the automatic measurement of convergence and for the automatic determination of corrections to be made in deflectors in order to obtain correct convergence with trichromatic cathode tunes. It also pertains to a machine for the application of the said method.

2. Description of the Prior Art

In general, trichromatic cathode tube deflectors exhibit convergence errors at manufacture, even when the manufacturing is done with great care. At present, to correct these errors, when they are not negligeable, an operator has to adjust each deflector in the right position on a standard trichromatic cathode tube on which a bar test pattern is displayed. Then, depending on the image deformations that he observes on the screen of this tube, the operator proceeds to make mechanical and/or magnetic adjustments of the deflectors by fixing magnetic correction parts on them at the places that he judges to be appropriate. The quality of the finally obtained correction depends on the experience of the operator and on his ability to establish a correct correlation between the phenomena observed on the tube of the screen and the adjustments to be made. Even with a very experienced operator, a correction process of this type is relatively slow: an average of two to four minutes is needed per deflector.

SUMMARY OF THE INVENTION

An object of the present invention is a method for the automatic measurement of convergence of deflectors as well as a method to determine the quality of pre-set deflectors according to a "right/not right" criterion, and a method by which it is possible to make the above-mentioned corrections optimally, quickly without having to call upon the services of an operator to determine the positions of the correcting parts for each deflector and the number of these parts.

Another object of the present invention is a machine which can automatically and quickly give the characteristics of the various corrections needed for each deflector, a machine that is simple to use and has the lowest possible cost price.

The method according to the present invention consists in placing each adjusted or pre-set deflector mechanically and/or magnetically, always in the same position on the neck of a reference cathode tube, in producing a crossed bar test pattern on the screen of this tube, in measuring the absolute coordinates of the longitudinal axes of these bars at several points, preferably 9 to 25 points, of these bars, the said points being preferably evenly distributed on the surface of the screen and advantageously placed symmetrically with respect to the vertical and horizontal axes of the surface of the screen, in computing the deviation values of coordinates for the beams of two different guns, in standardizing, namely correcting, the values obtained so as to take into account the non-adjusted positioning of the deflector and/or convergence faults at the center of the tube and/or deviations between the tube used and a theoretical tube, thus obtaining values corresponding to a correct theoretical positioning of the deflector, and in deducing therefrom whether the defector used is correct or incorrect, i.e. whether its parameters are within a range of values or not. Using the deviation values of the coordinates thus calculated, the convergence parameters of the measured deflector are determined in a manner known per se. According to an advantageous aspect of the invention, the various corrections that may be necessary are given by comparing the standardized values and the convergence parameters thus obtained, with different values of an experimentally pre-established table that gives, as a function of the various values of a range of standardized values, the corresponding overall or pinpoint corrections to be made on the deflectors. On the basis of these standardized values, it is possible, for frame coil deflectors that are not yet immobilized with respect to the line coil, to determine the adjustment, in position, of this coil similarly.

The machine according to the invention comprises a measuring stand that supports a cathode tube, power supply and deflection circuits for this tube, a test pattern generator, a set for the measurement of coordinates of various zones of the cathode tube screen, a device to process data given by the measuring set, the said processing device comprising circuits to determine coordinates of axes of luminous bars, circuits to convert values of coordinates into standardized values, memorizing devices that memorize a table of correspondence between standardized values and necessary corrections, and a comparison circuit.

BRIEF DESCRIPTION OF THE DRAWINGS

The present invention will be better understood from the following detailed description of an embodiment taken as a non-exhaustive example and illustrated by the appended drawings of which:

FIG. 1 is a block diagram of a machine according to the invention,

FIG. 2 is a simplified plane view of a measuring set of the machine according to the invention placed on the screen of the cathode tube machine, and, FIGS. 3 to 5 are simplified schematic views of bar test patterns that explain the general correction method of the invention.

DESCRIPTION OF A PREFERRED EMBODIMENT

The schematic measuring stand shown in FIG. 1 comprises firstly a so-called "reference" cathode tube 1. It is possible to use a conventional trichromatic cathode tube of very high quality but, according to the preferred embodiment of the invention, a three-gun tube (placed in the same way as in a conventional trichromatic tube) is used, without mask and having a uniform layer of green phosphorus. A tube of this type is more sensitive than a conventional trichromatic tube and can be used to obtain a continuous line on the screen, thus making it possible to measure the entire spot.

The tube 1 is powered at very high voltage by a conventional generator 2. A deflector 3 to be measured is placed on the neck of the tube 1. To simplify handling operations, and make it possible to automate them, the deflector 3 is fixed in a standard position with respect to the tube, this position being identical for all the deflectors subjected to measurement. The standard position is a mean position between the various correct positions of various deflectors of a series of deflectors which are considered to have been adjusted properly and for which the right qualities are checked on a prior art measuring stand.

The deflector 3 is powered by a conventional scanning generator 4. The tube 1 is connected to a test pattern generator 5 that produces a bar test pattern with alternating horizontal and vertical bars, the luminosity of which, considered crosswise, is modulated for example, according to a relationship that is at least approximately Gaussien as described in the French patent No. 83 04981 by the Applicant. This generator 5 is alternately connected to the three guns of the tube 1.

A measuring set 6 is applied to the screen of the tube 1. The set 6 has several sensors 7 fixed to an appropriate support 8, for example 9 sensors placed at the "strategic" positions of the screen where the convergence measurements are the most useful. These places are, for example, the four corners, the center and the midpoints of the four sides. Of course, the sensors 7 are set in such a way and the horizontal bar test patterns 9 and vertical bar test patterns 10 are produced in such a way that the axes of the bars pass substantially through the centers of the sensors 7. As proposed in the said French patent, the sensors may be placed perpendicular to the axis of the bars, but this would make it necessary to rotate the said sensors on themselves by 90° when going from the horizontal bars to the vertical bars. According to an advantageous characteristic of the invention, the sensors 7 are set at 45° with respect to the axis of the bars and to obtain the true deviation values in Cartesian coordinates, it suffices to multiply the measured deviation values by $1/\sqrt{2} = \sqrt{2}/2$, these measurements being necessarily made with horizontal and then vertical bars (or conversely).

In a manner similar to that proposed by the said French patent, a circuit 11 is used to measure the convergence, for a trichromatic tube, by measuring the deviation between the positions of the bars obtained for two different beams and then by multiplying the results of the measurements by $\sqrt{2}/2$ if, as stipulated above, the sensors are inclined at 45°.

Of course if, instead of measuring the convergence of the trichromatic tubes, it is sought to determine the qualities of the deflectors and any necessary corrections, green tubes with three guns and without masks are preferably used as specified above.

Then the rough measurements obtained are standardized by means of a circuit 12, i.e. the measurements are converted in order to re-establish those that would have been obtained if the deflector were in a standardized measuring position. This position is the usual one for measuring a deflector on a cathode tube when the convergences at the center are set at zero and when the deflector is rotated, around the neck of the tube, in such a way that the central horizontal line of the test pattern corresponds with the mechanical horizontal axis of the glass envelope (screen) of the tube and when the deflector is shifted in X and Y (translation or "tilt") so as to balance the convergence faults of the lateral beams (red and blue) at the 6H and 12H points (in the middle of the large sides of the screen) for example. (The various points of the periphery of the screen are identified by analogy with the dial of a watch : 12 hours, 5 hours, etc). Thus, for one type of deflector, it is possible to establish the variation relationships of the convergences depending on the position of the deflector on the neck of the tube (by rotation or by shifting in X and Y) and depending on the configuration of the convergences at the center. The knowledge of these relationships will make it possible to deduce, for a deflector subjected to measurement and placed on the tube neck in a fixed position, the corrections to be made to the measurements to re-establish those values that would have been got if the deflector had been in a standardized position. These corrections are determined on the basis of a member of indicators which are, for example, the convergence faults at the center, the 3H-9H alignment fault of a green bar test pattern (namely a horizontal bar passing through the center of the screen), red/blue convergence symmetry faults at 6H-12H.

If the variation relationships are likened to linear relationships (this can generally be done with a good approximation, otherwise, if greater precision is sought, more complex relationships may be set up), the said corrections may be determined simply, according to the following example:

Take, at the point P, the rough measurements Ph and Pv relating respectively to horizontal and vertical bar test patterns. Let Cx and Cy be the convergence faults at the center (between horizontal bars and vertical bars respectively) and let Av and Cv be the vertical amplitude and the skew defining the convergence symmetry faults at 6H and 12H (namely at the middle of the bottom and top large sides of the screen) of the red and blue beams. These values Av and Cv are given by the relationships:

$$Av = \frac{M12H - M6H}{2} \quad Cv = \frac{M12V - M6V}{2}$$

M12H, M6H, M12V and M6V being respectively the rough measurements made between horizontal bars (H) and vertical bars (V) at the points 12H and 6H of the screen.

The standardized values of these rough measurements NH and NV (between horizontal and vertical bars) are then given by the relationships:

NH =PH −a.Cx −b.Cy −c.Av −d.Cv

NV =PV −e.Cx −f.Cy −g.Av −h.Cv

In these relationships, the coefficients a, b . . . h are those of the above-mentioned convergence variation relationships, at the point P, for the various corresponding parameters.

All these computations can be done by a computer, programmed in a way that is obvious to those skilled in the art.

The right choice of the position of the deflector to be measured on the cathode tube neck makes it possible to obtain convergence symmetry faults of low relative amplitude (generally smaller than or equal to 1 mm) at 6H/12H. Thus, in most cases, the convergence variation relationships can be likened to linear relationships.

Through the above-described method of standardization by computation, it is also possible to introduce an additional correction representing the deviation, if any, in the convergence characteristics of the tube on which the measurements are made with respect to an "ideal" reference tube. This additional correction can be made in a way similar to that used for standardization, for each of the points of measurement.

A circuit 13 compares the standardized values available at the output of the computer 12 with the corresponding theoretical values. These theoretical values are stored in a memory of the circuit 13 which compares them simply with the standardized values.

The difference signal (convergence deviation), produced by the circuit 13, is available at its output 13A, from where it can be sent to any appropriate processing device such as a memorizing device or recording device or statistical processing device to monitor production quality.

The output 13A is, furthermore, connected to a decision device 14 which essentially comprises a threshold circuit. The thresholds of this circuit correspond to the maximum permissible values for standardized values or convergence deviations (permissible deviations depending on specifications or criteria related to a limited number of sensors and to the knowledge of the product). This circuit 14 has two outputs: 14A for "correct" (within tolerance thresholds) and 14B for "incorrect". Of course, should the deflectors be judged to be "correct", there is no reason to do any other processing. If, on the contrary, they are judged to be "incorrect", the question of salvaging them arises for, as a rule, it is possible to correct their convergence faults using magnetic shunts.

A device 15, activated by the output 14B, can be used to apply a first correction level leading to the use, known per se, of magnetic shunts with a localized effect on the screen, generally at points on the periphery of the screen. The circuit 15 essentially comprises a memory device in which the characteristics of the various pinpoint corrections needed are memorized according to the various convergence deviation values. Since it is generally sought to use the least possible number of different types of magnetic shunts and to limit the number of their locations, a given correction will be made to correspond to a range of several convergence deviation values.

The device 15 further comprises a comparator connected: firstly, to this memory device and, secondly, to the output 13A of the circuit 13, the said comparator giving, at the output 15A of the device 15, the characteristics of the pinpoint correction needed.

This correction method applied by the device 15 is similar to the method used by well-trained operators, but the device of the invention employs its method more quickly and more precisely (the reactions of an operator may vary during the day, depending on fatigue and various other factors).

According to the invention, it is also possible to use a more elaborate correction method. In this case, an overall correction of the image is made: the device of the invention comprises a device 16, which uses standardized measurements given by the circuit 12 to compute all the significant parameters of an image. It can thus verify that the symmetry of the image is correct (up/-down and left/right) and check the correspondence between the astigmatic condition of the magnetic fields of the deflector measured and the standard condition (reference condition) that should be obtained. This device 15 is activated by the output 14B of the circuit 14. The output of the device 16 is connected to a device 17. The device 17 has, in memory, the theoretical convergence parameters of the type of deflector being tested as well as the overall corrections corresponding to the deviations between the theoretical parameters and the computed parameters. These corrections are available at the output 18.

We shall now explain the correction method with reference to the examples of FIGS. 3 to 5 of the drawing, which refer to a very simple example of possible configuration.

Take a deflector with a standardized image like the one shown in FIG. 3 (in FIGS. 3 to 5, the solid lines correspond to the "red" gun and the broken lines correspond to the "blue" gun). If a pinpoint correction were made on this deflector, it would be necessary to correct the points 2H and 10H (the convergence error e1 at 2H as well as 10H is markedly greater than that allowed by the specifications). These pinpoint corrections are made in a manner known per se and, as shown in FIG. 4, an image is obtained for which the error e2 at 2H and 10H is about half of the error e1. However, a major defect remains in 3H–9H for which it will be necessary to make one or more additional pinpoint corrections. If, on the contrary, an analysis is made right from the beginning (FIG. 3) of the parameters of the entire image, a 3H–9H imbalance or cross-over fault is deduced from it and, having measured the value of this fault, it is possible to determine the appropriate overall correction. A computation, done in a manner known per se, indicates that after the appropriate correction of this cross-over fault, all the points of the image will be appreciably within the limits of the specifications. After a "overall" correction of this type, an image is obtained like the one of FIG. 5. Thus a correction is made that renders the magnetic fields symmetrical, and an image that is far more symmetrical than the previous one is obtained. In particular, all the internal points, where the deformations are more glaring for an appreciation of the quality of the images shown on the screen, will then have small faults.

A overall correction method of this type could possibly be undertaken by a highly trained operator but, for this operation to be done properly, the operator would have to perform many lengthy measurements and computations which are sometimes less simple than in the above example, for example in a case where the convergence faults would affect all four corners of the image: this would be incompatible with the requirements of mass production.

According to the method of the invention, the overall correction may, of course, result in correcting other faults at the same time. Thus, on the basis of the analysis of the parameters of the entire image, it is possible, if necessary, also to remove the "balance" faults. This, associated with the above-mentioned cross-over correction, makes it possible to give the image almost perfect symmetry.

In other possible examples, it is also possible to correct a line or frame field astigmatism fault to bring the characteristics of the deflector closer to those of a reference product.

The advantage of the machine used to apply the invention is that it can be used to associate these various corrections very swiftly and optimally to determine the simplest and smallest number of corrections needed (an overall correction generally has the same effect or a better effect than several pinpoint corrections and, furthermore, pinpoint corrections may even create faults at other places).

The prior determining of the position of the shunts is done experimentally, taking into account the physical parameters of the deflector and the usual knowledge of those skilled in the art.

Of course, the various devices 12 to 17 may be replaced by a single computer that performs all their functions.

Since the sensors 7 have very precise geometrical positions with respect to the screen of the tube 1, they make it possible to determine the absolute coordinates of the lines of the beams on the entire screen (after the machine has been calibrated by means of a previously-measured reference deflector). Using these measurements of coordinates, made on the monochrome image (preferably the green beam image), the machine may compute, in a manner known per se all the components of the geometry of the image such as orthogonality, East/West and North/South pincushion distortions, geometrical trapezoids, etc. It is then possible to also measure the horizontal and vertical sensitivities of the deflector, namely the amplitudes of the image for monitored horizontal and vertical scanning currents.

What is claimed is

1. A method for the automatic measurement of convergence and for the determination of corrections to be made to deflectors for trichromatic cathode tubes, wherein each adjusted or pre-set deflector is placed mechanically and/or magnetically, always in the same position on the neck of a reference cathode tube, a crossed bar test pattern is produced on the screen of this tube, the absolute coordinates of the longitudinal axes of these bars are measured at several points (preferably 9 to 25 points) of these bars, the deviation values of coordinates for the beams of two different guns are computed, the values obtained are standardized so as to take into account a non-adjusted positioning of the deflector and/or convergence faults at the center of the tube and/or deviations between the tube used and a theoretical tube to thus obtain values corresponding to a correct theoretical positioning of the deflector and the convergence errors of the deflector are computed from these standardized values.

2. A method according to the claim 1 wherein the measuring points of the crossed bar test patterns are evenly distributed on the surface of the screen, symmetrically with respect to the vertical and horizontal axes of the screen.

3. A method according to the claim 1 wherein the tube used is a 3-gun tube without mask and with an entirely green screen.

4. A method according to the claim 1 for frame coil deflectors that are not yet immobilized with respect to the line coil, wherein the adjustment, in position, of this coil is determined from standardized measurements.

5. A method according to the claim 1 wherein the convergence deviations of the measured deflector are computed from standardized measurements.

6. A method according to the claim 5 wherein the quality of the deflector is determined by a "correct/incorrect" criterion depending on whether these convergence deviations or these standardized values are within a range of values or not.

7. A method according to the claim 5 wherein the pinpoint corrections to be made to the deflector are determined from the convergence deviation values of the said deflector.

8. A method according to claim 5 wherein the convergence parameters of the deflector are computed from the standardized convergence values of the said deflector, and the overall corrections to be applied to the said deflector are deduced therefrom.

9. A method according to the claim 1 wherein the components of the geometry of the cathode tube image are determined from the values measured by the sensors with a monochromatic beam.

10. A machine for the automatic measurement of convergence and for the automatic determining of corrections to be made to deflectors for trichromatic tubes, comprising a reference cathode tube on which each adjusted or preset deflector is placed mechanically or magnetically in the same position, power supply and deflection circuits for this tube, a test pattern generator for producing a crossed bar test pattern on the screen of this tube, a set for the measurement of coordinates of various zones of the tube screen at several points, a device to process data given by the measuring set, the said processing device comprising devices to determine the absolute coordinates of the longitudinal axes of luminous bars produced by the test pattern generator and the deviation values of coordinates for the beams of two different guns, connected to circuits for the conversion of values of coordinates into standardized values so as to take into account a non-adjusted positioning of the deflector and/or convergent faults at the center of the tube and/or deviations between the tube used in a theoretical tube, and a device for the computation of convergence errors from these standardized values.

11. A machine according to the claim 10 wherein the convergence errors computing device is followed by a decision device with threshold circuits.

12. A machine according to the claim 10 wherein the convergence errors computing device is connected to a device for the determining of pinpoint corrections.

13. A machine according to the claim 10 wherein the device for conversion into standardized values is connected to a device for computing the parameters of the entire image produced by the test pattern generator, the said parameter computing device being itself connected to a device for determining overall corrections.

* * * * *